(12) United States Patent
Colglazier

(10) Patent No.: US 10,176,118 B2
(45) Date of Patent: Jan. 8, 2019

(54) ALTERNATIVE DIRECT-MAPPED CACHE AND CACHE REPLACEMENT METHOD

(71) Applicant: Lenovo Enterprise Solutions (Singapore) Pte. Ltd., Singapore (SG)

(72) Inventor: Daniel J. Colglazier, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 105 days.

(21) Appl. No.: 15/086,898

(22) Filed: Mar. 31, 2016

(65) Prior Publication Data

US 2017/0286317 A1    Oct. 5, 2017

(51) Int. Cl.
*G06F 12/12* (2016.01)
*G06F 12/122* (2016.01)
*G06F 12/128* (2016.01)

(52) U.S. Cl.
CPC ......... *G06F 12/122* (2013.01); *G06F 12/128* (2013.01); *G06F 2212/621* (2013.01); *G06F 2212/69* (2013.01)

(58) Field of Classification Search
CPC ............... G06F 12/122; G06F 12/128; G06F 2212/621; G06F 2212/69
See application file for complete search history.

(56) References Cited

U.S. PATENT DOCUMENTS

2010/0205344 A1\* 8/2010 Caprioli ............. G06F 12/1063 711/3

\* cited by examiner

*Primary Examiner* — Yong J Choe
(74) *Attorney, Agent, or Firm* — Jeffrey L. Streets

(57) ABSTRACT

A method includes storing a first block of main memory in a cache line of a direct-mapped cache, storing a first tag in a current tag field of the cache line, wherein the first tag identifies a first memory address for the first block of main memory, and storing a second tag in a previous miss tag field of the cache line in response to receiving a memory reference having a tag that does not match the tag stored in the current tag field. The second tag identifies a second memory address for a second block of main memory, and the first and second blocks are both mapped to the cache line. The method may further include storing a binary value in a last reference bit field to indicate whether the most recently received memory reference was directed to the current tag field or previous miss tag field.

20 Claims, 9 Drawing Sheets

| State | VB | LRB | MRB | |
|---|---|---|---|---|
| A | 0 | - | - | Invalid entry |
| B | 1 | 0 | 0 | Current entry referenced once |
| C | 1 | 0 | 1 | Current entry multiple references |
| D | 1 | 1 | - | Previous miss entry referenced last |

| Outcome | Current Entry | Previous Miss Entry |
|---|---|---|
| 1 | Miss | Miss |
| 2 | Hit | Miss |
| 3 | Miss | Hit |

| | Conventional Direct – Mapped Cache | | Alternative Direct – Mapped Cache | | | | | | |
|---|---|---|---|---|---|---|---|---|---|
| Memory Reference 21 | Cache Entry 22 | Cache Hit or Miss 23 | Current Cache Entry 24 | Cache Hit or Miss 28 | Previous Miss Entry 25 | Last Reference Bit 26 | Multiple Reference Bit 27 | State | Outcome |
| | Invalid | | Invalid | | Invalid | Invalid | Invalid | A | |
| 1  X | X | Miss | X | Miss | Invalid | 0 | 0 | B | 1 |
| 2  Y | Y | Miss | X | Miss | Y | 1 | 0 | D | 1 |
| 3  X | X | Miss | X | Hit | Invalid | 0 | 1 | C | 2 |
| 4  Y | Y | Miss | X | Miss | Y | 1 | 1 | D | 1 |
| 5  X | X | Miss | X | Hit | Invalid | 0 | 1 | C | 2 |
| 6  Y | Y | Miss | X | Miss | Y | 1 | 1 | D | 1 |
| 7  X | X | Miss | X | Hit | Invalid | 0 | 1 | C | 2 |
| 8  Y | Y | Miss | X | Miss | Y | 1 | 1 | D | 1 |
| Total Cache Hits: Cache Hit Rate: | 0 of the last 6  0% | | 3 of the last 6  50% | | | | | | |

*FIG. 5*

| | Conventional Direct – Mapped Cache | | Alternative Direct – Mapped Cache | | | | | | |
|---|---|---|---|---|---|---|---|---|---|
| Memory Reference | Cache Entry | Cache Hit or Miss | Current Cache Entry | Cache Hit or Miss | Previous Miss Entry | Last Reference Bit | Multiple Reference Bit | State | Outcome |
| 1 | X | Invalid | Miss | Invalid | Miss | Invalid | Invalid | Invalid | A | |
| 2 | X | X | Hit | X | Hit | Invalid | 0 | 0 | B | 1 |
| 3 | X | X | Hit | X | Hit | Invalid | 0 | 1 | C | 2 |
| 4 | X | X | Hit | X | Hit | Invalid | 0 | 1 | C | 2 |
| 5 | Y | X | Miss | X | Miss | Invalid | 0 | 1 | C | 2 |
| 6 | X | Y | Miss | X | Hit | Y | 1 | 1 | D | 1 |
| 7 | X | X | Hit | X | Hit | Y | 0 | 1 | C | 2 |
| 8 | X | X | Hit | X | Hit | Y | 0 | 1 | C | 2 |
| 9 | X | X | Hit | X | Hit | Y | 0 | 1 | C | 2 |
| 10 | Y | X | Miss | X | Miss | Y | 1 | 1 | D | 1 |
| Total Cache Hits: Cache Hit Rate: | 3 of the last 5  60% | | 4 of the last 5  80% | | | | | | |

FIG. 6

| | Conventional Direct-Mapped Cache | | Alternative Direct-Mapped Cache | | | | | | |
|---|---|---|---|---|---|---|---|---|---|
| Memory Reference | Cache Entry | Cache Hit or Miss | Current Cache Entry | Cache Hit or Miss | Previous Miss Entry | Last Reference Bit | Multiple Reference Bit | State | Outcome |
| | Invalid | | Invalid | | Invalid | Invalid | Invalid | A | |
| 1  X | | Miss | | Miss | | | | | 1 |
| | X | | X | | Invalid | 0 | 0 | B | |
| 2  Y | | Miss | | Miss | | | | | 1 |
| | Y | | X | | Y | 1 | 0 | D | |
| 3  X | | Miss | | Hit | | | | | 2 |
| | X | | X | | Invalid | 0 | 1 | C | |
| 4  Y | | Miss | | Miss | | | | | 1 |
| | Y | | X | | Y | 1 | 1 | D | |
| 5  X | | Miss | | Hit | | | | | 2 |
| | X | | X | | Invalid | 0 | 1 | C | |
| 6  Y | | Miss | | Miss | | | | | 1 |
| | Y | | X | | Y | 1 | 1 | D | |
| 7  X | | Miss | | Hit | | | | | 2 |
| | X | | X | | Invalid | 0 | 1 | C | |
| 8  X | | Hit | | Hit | | | | | 2 |
| | X | | X | | Invalid | 0 | 1 | C | |
| 9  X | | Hit | | Hit | | | | | 2 |
| | X | | X | | Invalid | 0 | 1 | C | |
| 10  Y | | Miss | | Miss | | | | | 1 |
| | Y | | X | | Y | 1 | 1 | D | |
| 11  Y | | Hit | | Miss | | | | | 3 |
| | Y | | Y | | Invalid | 0 | 1 | C | |
| 12  Y | | Hit | | Hit | | | | | 2 |
| | Y | | Y | | Invalid | 0 | 1 | C | |

*FIG. 7A*

| 13 | X | | Miss | | Miss | | | | | 1 |
|---|---|---|---|---|---|---|---|---|---|---|
| | | X | | Y | | X | 1 | 1 | D | |
| 14 | Y | | Miss | | Hit | | | | | 2 |
| | | Y | | Y | | Invalid | 0 | 1 | C | |
| 15 | X | | Miss | | Miss | | | | | 1 |
| | | X | | Y | | X | 1 | 1 | D | |
| 16 | Y | | Miss | | Hit | | | | | 2 |
| | | Y | | Y | | Invalid | 0 | 1 | C | |
| 17 | X | | Miss | | Miss | | | | | 1 |
| | | X | | Y | | X | 1 | 1 | D | |
| 18 | Y | | Miss | | Hit | | | | | 2 |
| | | Y | | Y | | Invalid | 0 | 1 | C | |
| 19 | X | | Miss | | Miss | | | | | 1 |
| | | X | | Y | | X | 1 | 1 | D | |
| 20 | X | | Hit | | Miss | | | | | 3 |
| | | X | | X | | Invalid | 0 | 1 | C | |
| 21 | X | | Hit | | Hit | | | | | 2 |
| | | X | | X | | Invalid | 0 | 1 | C | |
| 22 | Y | | Miss | | Miss | | | | | 1 |
| | | Y | | X | | Y | 1 | 1 | D | |
| 23 | Y | | Hit | | Miss | | | | | 3 |
| | | Y | | Y | | Invalid | 0 | 1 | C | |
| 24 | Y | | Hit | | Hit | | | | | 2 |
| | | Y | | Y | | Invalid | 0 | 1 | C | |
| Total Cache Hits: Cache Hit Rate: | | 4 of the last 12 33.3% | | 5 of the last 12 41.7% | | | | | | |

*FIG. 7B*

ALTERNATIVE DIRECT-MAPPED CACHE AND CACHE REPLACEMENT METHOD

BACKGROUND

Field of the Invention

The present invention relates to replacement policies and methods of using direct-mapped caches.

Background of the Related Art

Computers continue to get faster and more efficient to meet a heavy demand for processing many different types of tasks. Cache memory makes a limited amount of data rapidly accessible to a processor. To facilitate the access, the cache memory may be physically closer to the processor than main memory. In fact, a processor (CPU) cache (or L1 cache) may be physically located on the same chip as the processor and may be dedicated to a single processor core on a multi-core chip.

Data is transferred between main memory and cache in blocks of fixed size, called cache lines. When a cache line is copied from memory into the cache, a cache entry is created. The cache entry will include the copied data as well as the requested memory location.

When the processor needs to read or write a location in main memory, the processor first checks for a corresponding entry in the cache. The cache checks for the contents of the requested memory location in any cache lines that might contain that address. If the processor finds that the memory location is in the cache, a cache hit has occurred. However, if the processor does not find the memory location in the cache, a cache miss has occurred. In the case of a cache hit, the processor immediately reads or writes the data in the cache line. For a cache miss, the cache allocates a new entry and copies in the requested data from main memory, then the request is fulfilled from the contents of the cache. The proportion of accesses that result in a cache hit is known as the hit rate, and can be a measure of the effectiveness of the cache for a given program or algorithm.

Read misses delay processor execution because the processor must wait for the requested data to be transferred from memory, which is much slower than reading from the cache. Write misses may occur without such delay, since the processor can continue execution while data is copied to main memory in the background.

In order to make room for the new entry on a cache miss, the cache may have to evict one of the existing entries. The heuristic that is used to choose the entry to evict and the conditions of the eviction is called the replacement policy. The fundamental problem with any replacement policy is that it must predict what data will be requested in the future.

FIG. 1 is a diagram illustrating the use of a direct-mapped cache. Each main memory block can be mapped to only one location in a direct-mapped cache. This mapping limitation has the advantage of making it quick and easy to determine whether a cache hit has occurred. The disadvantage is that two or more active main memory segments or blocks may map to the same direct-mapped cache entry which will produce a low cache hit rate and lower performance.

Furthermore, a portion of the main memory address is used to directly map to a cache entry. In this example, a main memory address has four bits labeled A, B, C and D, wherein bits C and D (serving as an index) are used to determine the proper cache entry or line. The other main memory address bits A and B (serving as a tag) are stored in the cache directory so that it is known which main memory block is stored in the cache line. When a main memory block is referenced, the cache is checked to see if it holds that block. This is done by using address bits C and D to determine which cache line to check and by using address bits A and B to see if they match what is stored in the directory. If they match, then this is a cache hit and the memory reference can be satisfied by the cache line which is faster than accessing main memory. Accordingly, a CPU may read from, or write to, the referenced memory block in the cache line. If the memory reference is mapped to a line that does not have a matching tag (bits A and B), then the request must be fulfilled by the slower main memory. When a cache miss occurs in a conventional direct-mapped cache, the current cache entry is replaced by the requested main memory block.

FIG. 2 is a diagram of a conventional direct-mapped cache illustrating how a direct-mapped cache is organized, and how the cache functions to distinguish between a cache hit and a cache miss. Each memory address may be considered to having three parts. The lowest address bits are called the byte offset. Since caches work with cache lines that are typically 64 or 128 bytes, there is no need to address anything smaller than the cache line. Therefore, the address bits used to select a particular byte in a cache line are not used in the cache itself. These address bits are the byte offset.

The next portion of the memory address is the Index. The address bits of the index are used to determine the particular cache line being addressed. The rest of the memory address is referred to as the tag. The address bits of the tag are stored in the cache directory and used to keep track of the address of the block that is stored in a cache line. A comparator is used to compare the tag of the memory address to the one stored in the cache directory to determine whether there is a cache hit or miss.

Along with the tag, each entry or line of the cache directory may have three more fields. The valid bit (VB) indicates whether or not the line is valid or not. An invalid line always produces a cache miss. The modified bit (MB) indicates whether or not this entry has been modified and may differ from main memory. If an entry has been modified, it will need to be written back to main memory before it is replaced. Some caching algorithms do not allow modified entries, so this field is not present in all direct-mapped cache implementations. The final field is the data which is a cache line portion of main memory. The purpose of the cache is to hold frequently used portions of main memory so that the processor can access it faster than it could from main memory.

BRIEF SUMMARY

One embodiment of the present invention provides a method comprising storing a first block of main memory in a cache line of a direct-mapped cache, storing a first tag in a current tag field of the cache line, wherein the first tag identifies a first memory address for the first block of main memory, and storing a second tag in a previous miss tag field of the cache line in response to receiving a memory reference having a tag that does not match the tag stored in the current tag field. The second tag identifies a second memory address for a second block of main memory, and the first and second blocks of main memory are both mapped to the cache line.

Another embodiment of the present invention provides a computer program product for implementing a cache replacement policy, the computer program product comprising a non-transitory computer readable storage medium having program instructions embodied therewith, wherein the program instructions are executable by a processor to cause the processor to perform a method. The method comprises storing a first block of main memory in a cache line of a direct-mapped cache, storing a first tag in a current tag field of the cache line, wherein the first tag identifies a first memory address for the first block of main memory, and storing a second tag in a previous miss tag field of the cache line in response to receiving a memory reference having a tag that does not match the tag stored in the current tag field. The second tag identifies a second memory address for a second block of main memory, and the first and second blocks of main memory are both mapped to the cache line.

BRIEF DESCRIPTION OF THE SEVERAL VIEWS OF THE DRAWINGS

FIG. 5 is a table illustrating a sequence of events responsive to a first sequence (XYXYXYXYXY) of memory references using a conventional direct-mapped cache directory and an alternative direct-mapped cache directory according to embodiments of the present invention.

FIG. 6 is a table illustrating a sequence of events responsive to a second sequence (XXXXYXXXXY) of memory references using a conventional direct-mapped cache directory and an alternative direct-mapped cache directory according to embodiments of the present invention.

FIGS. 7A and 7B provide a table illustrating a sequence of events responsive to a third sequence (XYXYXYXXXXYYY) of memory references using a conventional direct-mapped cache directory and an alternative direct-mapped cache directory according to embodiments of the present invention.

DETAILED DESCRIPTION

Figure 1:
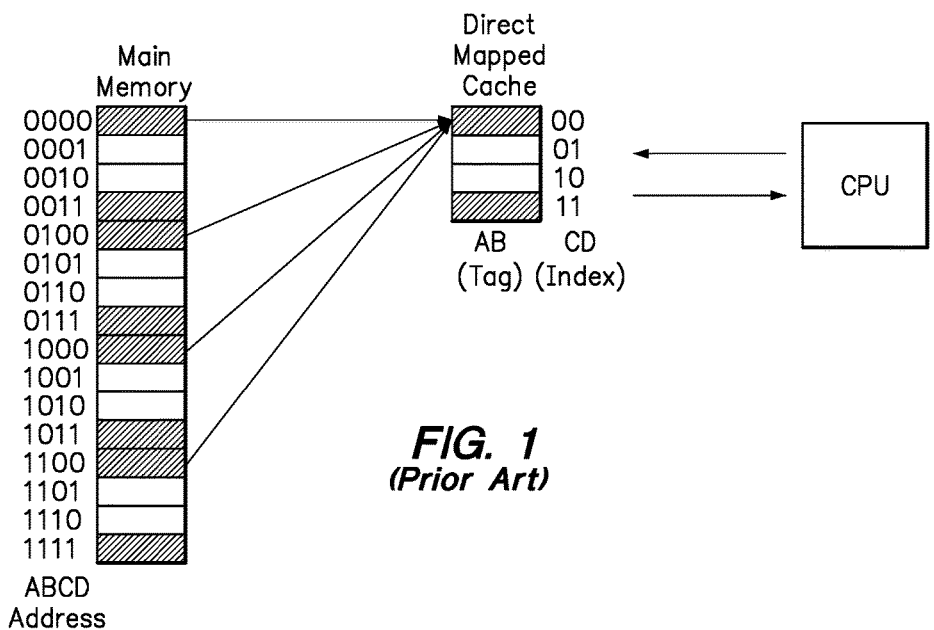
FIG. 1 is a diagram illustrating the use of direct-mapped cache.
Figure 2:
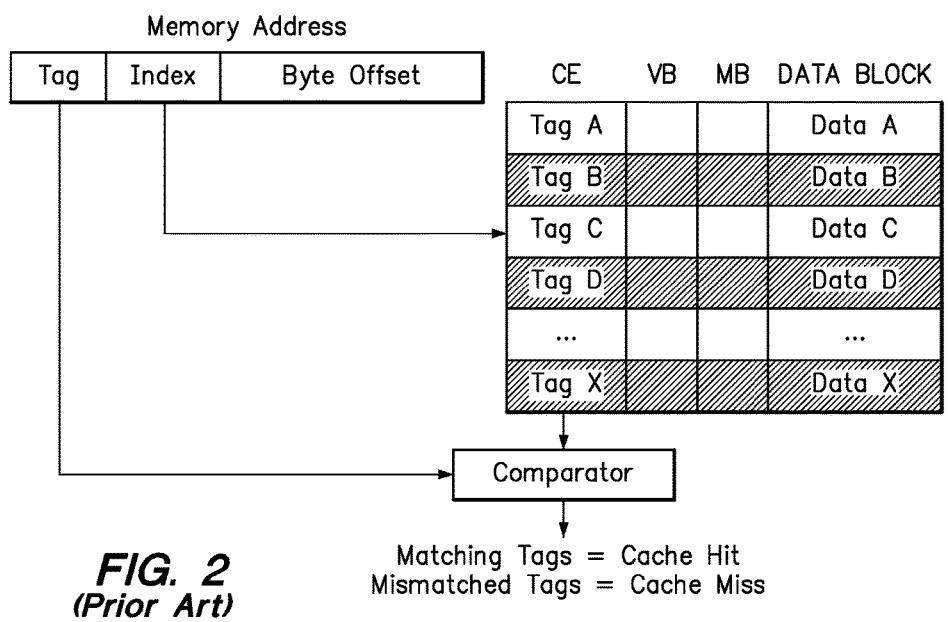
FIG. 2 is a diagram of a conventional direct-mapped cache distinguishing between a cache hit and a cache miss.

One embodiment of the present invention provides a method comprising storing a first block of main memory in a cache line of a direct-mapped cache, storing a first tag in a current tag field of the cache line, wherein the first tag identifies a first memory address for the first block of main memory, and storing a second tag in a previous miss tag field of the cache line in response to receiving a memory reference having a tag that does not match the tag stored in the current tag field. The second tag identifies a second memory address for a second block of main memory, and the first and second blocks of main memory are both mapped to the cache line.

The first block of main memory may be stored in the cache line in response to receiving a memory reference to the first block while the cache line does not have a valid block stored in the cache line. Furthermore, the first tag is stored in the current tag field of the cache line in response to storing the first block of main memory in the cache line.

Embodiments of the present invention may further comprise storing a binary value in a last reference bit field in the cache line of the direct-mapped cache, wherein the last reference bit indicates whether the most recently received memory reference was directed to the tag stored in the current tag field or the tag stored in the previous miss tag field. For example, the binary value stored in the last reference bit field might be a "0" to indicate that the most recently received memory reference was directed to the tag stored in the current tag field, or a "1" to indicate that the most recently received memory reference was directed to the tag stored in the previous miss tag field. An alternate convention would be suitable as well.

In one option, the method may respond to subsequently receiving a memory reference having a tag that matches the tag stored in the previous miss tag field and the binary value stored in the last reference bit field indicating that the most recent memory reference was directed to the tag stored in the previous miss tag field, by replacing the first block of main memory stored in the cache line with the second block of main memory and replacing the first tag in the current tag field with the second tag. In other words, when the cache receives a second of two consecutive, identical memory references that are cache misses (i.e., the tag doesn't match the tag stored in the current tag field), then the block of main memory identified by the two consecutive, identical memory references is retrieved from main memory and stored in the cache line as the new current cache entry. Data from the retrieved block may be provided to a process that provided the memory reference. Upon receiving additional memory references, the memory block stored in the cache line is treated as the current data entry unless replaced in the manner described above. Furthermore, if a block stored in the cache line has been modified since being written back to main memory, then the method will write the modified block back to main memory prior to replacing the first block of main memory with the second block of main memory in response to the first block having been modified since the first block was written back to main memory.

In another option, the method may respond to subsequently receiving a memory reference having a tag that matches the tag stored in the current tag field and the binary value stored in the last reference bit field indicating that the most recent memory reference was directed to the tag stored in the previous miss tag field, by maintaining the first block of main memory stored in the cache line, maintaining the first tag in the current tag field, and changing the binary value stored in the last reference bit field to indicate that the most recent memory reference was directed to the tag stored in the current tag field. In other words, where the most recent memory reference was a cache miss, a subsequently received memory reference that is a cache hit will result in no changes except changing the value of the last reference bit field to point to the current tag field. As a result, it would then take two consecutive, identical memory references that are a cache miss in order to result in replacement of the current cache data block.

In yet another option, the method may respond to subsequently receiving a memory reference having a tag that matches the tag stored in the previous miss tag field and the binary value stored in the last reference bit field indicating that the most recent memory reference was directed to the tag stored in the current tag field, by maintaining the first block of main memory stored in the cache line, maintaining the first tag in the current tag field, and changing the binary value stored in the last reference bit field to indicate that the most recent memory reference was directed to the tag stored in the previous miss tag field. In other words, where most recent memory reference was a cache hit, a subsequently received memory reference that is a cache miss will result in no changes except changing the value of the last reference bit field to point to the previous miss tag field. As a result, if the very next memory reference has a tag matching the tag in the previous miss tag field, then the current cache data block would be replaced.

In a further option, the method may respond to subsequently receiving a memory reference having a tag that matches the tag stored in the current tag field and the binary value stored in the last reference bit field indicating that the most recent memory reference was directed to the tag stored in the current tag field, by maintaining the first block of main memory stored in the cache line, maintaining the first tag in the current tag field, and maintaining the binary value stored in the last reference bit field to indicate that the most recent memory reference was directed to the tag stored in the current tag field. In other words, if the memory reference received is a cache hit following a previous cache hit, then there is no change to the cache, other than perhaps a change in the data stored in the cache line as a result of a write operation.

In a still further option, the method may respond to subsequently receiving a memory reference having an associated tag that does not match the tag stored in the previous miss tag field and does not match the tag stored in the current tag field, by maintaining the first block of main memory stored in the cache line, maintaining the first tag in the current tag field, storing the associated tag in the previous miss tag field and causing the last reference bit to indicate that the most recent memory reference was directed to the tag stored in the previous miss tag field. In other words, if a memory reference is a cache miss but is not directed to the same memory reference as the previous cache miss, then the previous miss tag field is updated with the tag of the most recently received memory reference.

Although the embodiments of the present invention are primarily directed to the cache replacement policy for a direct-mapped cache, the methods described herein may further comprise steps directed to reading or writing to the cache and reading or writing to main memory. For example, one method may further comprise performing a read operation on the block stored in the cache line in response to receiving a read instruction with a memory reference having a tag that matches the tag stored in the current tag field. Similarly, the method may further comprise performing a write operation on the block stored in the cache line in response to receiving a write instruction with a memory reference having a tag that matches the tag stored in the current tag field.

In another embodiment of the method, each cache line of the direct-mapped cache may further include a multiple reference bit (MRB) indicating whether the current memory address has been referenced more than once. A multiple reference bit may be useful in tracking whether the tag in the current tag field has been referenced more than one time.

Another embodiment of the present invention provides a computer program product for implementing a cache replacement policy, the computer program product comprising a non-transitory computer readable storage medium having program instructions embodied therewith, wherein the program instructions are executable by a processor to cause the processor to perform a method. The method comprises storing a first block of main memory in a cache line of a direct-mapped cache, storing a first tag in a current tag field of the cache line, wherein the first tag identifies a first memory address for the first block of main memory, and storing a second tag in a previous miss tag field of the cache line in response to receiving a memory reference having a tag that does not match the tag stored in the current tag field. The second tag identifies a second memory address for a second block of main memory, and the first and second blocks of main memory are both mapped to the cache line.

The foregoing computer program products may further include program instructions for implementing or initiating any one or more aspects of the methods described herein. Accordingly, a separate description of the methods will not be duplicated in the context of a computer program product.

Figure 3:
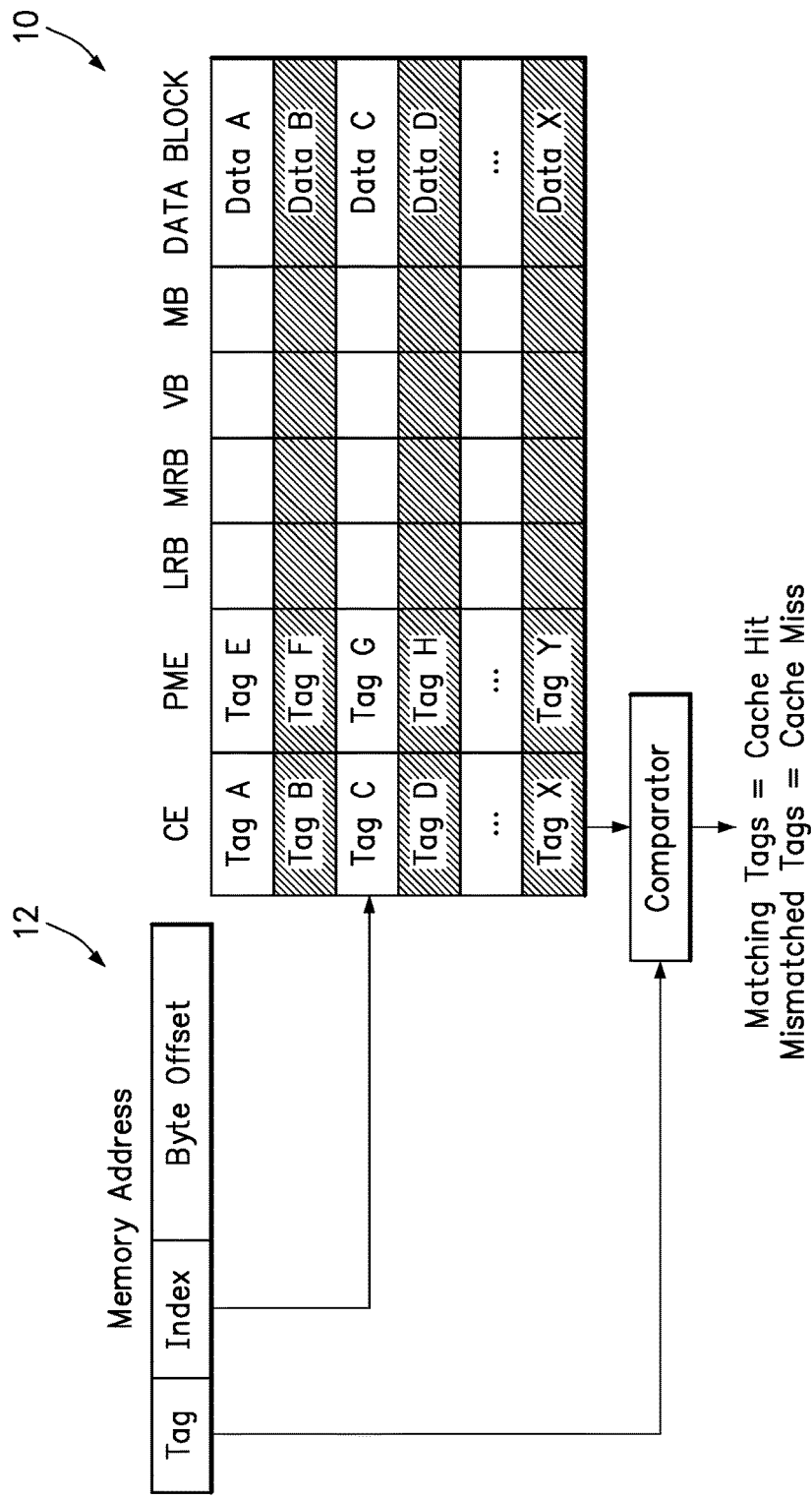
FIG. 3 is a diagram of an alternative direct-mapped cache according to one embodiment of the present invention.

FIG. 3 is a diagram of an alternative direct-mapped cache 10 according to one embodiment of the present invention. While the alternative direct-mapped cache 10 still has the current tag field (CE), the validity bit field (VB), the modified bit field (MB) and the data block field, each cache line of the cache 10 has the additional fields of a previous miss tag field (PME), a last reference bit field (LRB), and a multiple reference bit field (MRB). The previous miss tag field (PME) contains the tag of a memory address that most recently resulted in a cache miss since it didn't match the tag in the current tag field. The last reference bit field (LRB) keeps track of whether the most recent memory reference had a tag matching the current tag or the previous miss tag. The multiple reference bit field (MRB) keeps track of whether the current entry has been referenced more than once. While the cache line now has two tags, the tag stored in the current tag field is always the only tag that defines the main memory address associated with the data stored in the data block of that cache line. The previous miss tag field is merely a record of the last memory reference that was a cache miss.

When a memory address reference 12 is received by the cache 10, an index portion of the memory reference 12 identifies which line of the cache 10 is mapped to the memory reference, and a tag portion of the memory reference 12 is compared to the tag stored in the current tag field of the identified cache line. If the two tags match, then there is a cache hit and the data block stored in the cache line may be used in an associated read or write option. If the two tags do not match, then there is a cache miss and the read or write operation accompanying the memory address reference 12 must include an immediate access of main memory.

However, in accordance with embodiments of the present invention, the tag of the memory address reference 12 is then compared with the tag in the previous miss tag field (PME). If the tag does not match the tag in the previous miss tag field, then the tag is stored in the previous miss tag field and the last reference bit is set to indicate that the most recent reference was directed to the tag in the previous miss tag field. If the tag matches the tag in the previous miss tag field and the last reference bit indicates that the most recent reference was directed to the current tag, then the last reference bit is changed to indicate that the most recent reference was directed to the previous miss tag. Still further, if the tag matches the tag in the previous miss tag field and the last reference bit indicates that the most recent reference was directed to the previous miss tag, then the tag replaces the current tag, the data block associated with the tag replaces the data block, and the last reference bit is changed to indicate that the most recent reference was directed to the current tag.

Figures 4A, 4B, 4C:
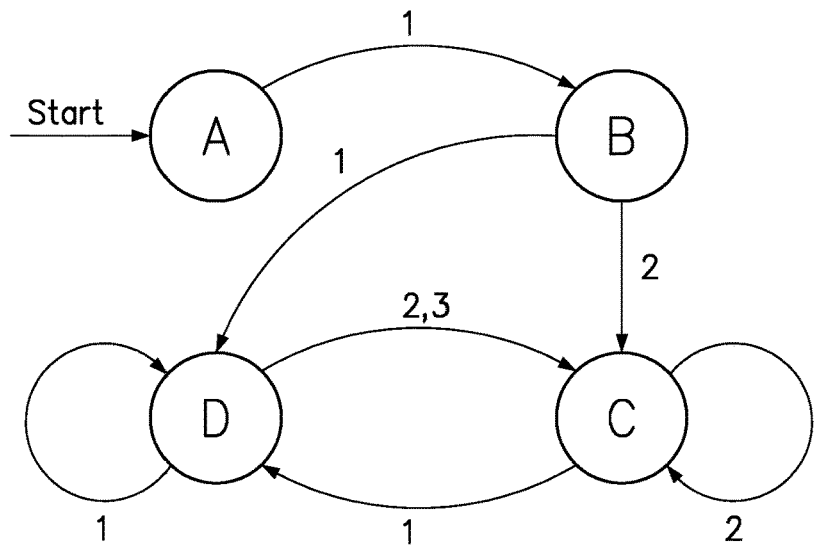
FIG. 4A is a table showing possible states of the improved direct-mapped cache.
FIG. 4B is a table showing possible cache hit or miss outcomes of the alternative direct-mapped cache.
FIG. 4C is a diagram showing each of the possible states set out in the table of FIG. 4A and how the outcomes set out in the table of FIG. 4B cause movement between the states according to an embodiment of the present invention.

FIG. 4A is a table showing possible states of the alternative direct-mapped cache. Each cache entry or line can be in one of four states. The first state (A) is the line is invalid, which may be indicated by a valid bit (VB) having a binary value of "0". The second state (B) is the line is valid, referenced only once, and was the last one referenced of those mapped to this entry. This state occurs when the valid bit (VB) has a binary value of "1", the multiple reference bit (MRB) has a binary value of "0", and the last reference bit (LRB) has a binary value of "0" (pointing to the current entry). The third state (C) is the line is valid, referenced more than once, and was the last memory address referenced among those memory addresses mapped to this cache entry. This state occurs when the valid bit (VB) has a binary value of "1", the multiple reference bit has a value of "1", and the last reference bit (LRB) has a binary value of "0". The fourth state (D) is the line is valid but the previous miss tag is associated with the last memory address referenced. This state occurs when the valid bit (VB) has a binary value of "1", and the last reference bit (LRB) has a binary value of "1".

FIG. 4B is a table showing possible cache hit or miss outcomes of the alternative direct-mapped cache. A cache hit to the current entry is simply a cache hit (see Outcome 2), and there is no need to compare the tag of the most recently received reference to the tag in the previous tag field. However, a cache miss to the current entry may also be characterized by either a miss to the tag in the previous miss tag field (Outcome 1) or a hit to the tag in the previous miss tag field (Outcome 3), such that it is necessary to perform a comparison between the tag of the most recently received reference and the tag in the previous miss tag field to determine whether Outcome 1 or Outcome 3 applies.

FIG. 4C is a diagram showing each of the possible states (A-D) set out in the table of FIG. 4A and how the outcomes (1-3) set out in the table of FIG. 4B cause transitions between the states according to an embodiment of the present invention.

State A, Outcome 1 transitions to State B: When in state A, the only possible outcome is 1 with a transition to B. An invalid line in the cache can only produce a cache miss and transition to the valid and referenced once state B.

In states B and C, the only outcomes are 1 and 2.

State B, Outcome 1 transitions to State D: When in state B and a miss occurs, the current entry is not replaced and the new reference's address is stored in the previous miss reference, which the last reference bit now points to.

State B, Outcome 2 transitions to State C: When in state B and a hit occurs, the line has then been referenced multiple times and transitions to state C.

State C, Outcome 1 transitions to State D: When in state C and a miss occurs, the current entry is not replaced and the new reference's address is stored in the previous miss reference which the last reference bit now points to.

State C, Outcome 2 transitions to State C: When in state C and a hit occurs, nothing changes except for possibly the modified bit.

State D is the only state in which all three outcomes are possible.

State D, Outcome 1 transitions to State D: When in state D and a miss occurs, the current entry is not replaced and the new reference's address is stored in the previous miss reference which the last reference bit now points to.

State D, Outcome 2 transitions to State C: When in state D and a hit occurs, the last reference bit is updated to point to the current entry with a possible update of the modified bit. This is the state and outcome that changes conventional cache misses into invention cache hits.

State D, Outcome 3 transitions to State C: When in state D and a previous miss entry hit occurs, the current entry is replaced by the new reference's address, the Last Reference Bit points to the Current Entry, and the Multiple Reference Bit becomes 1. This state and outcome changes what would have been conventional cache hits to invention cache misses, so, when in state D, more Current Entry hits need to occur than Previous Miss Entry hits.

Example 1

FIG. 5 is a table 20 illustrating a sequence of events responsive to a first sequence of memory references using a conventional direct-mapped cache directory and an alternative direct-mapped cache directory according to embodiments of the present invention. In reference to the table 20, assume that two lines of memory (line X and line Y) map to the same cache entry and alternate their references: XYXYXYXY . . . (See column 21). In a conventional direct-mapped cache (see columns 22-23) each of these references (column 21) will miss the cache (the hit rate is 0%), since each cache line (column 22) is replaced before being referenced again. With the alternative cache directory (see columns 24-27) and method of the present invention, the same XYXYXYXY . . . pattern (column 21) leads to a cache hit rate of 50% since the X entry (column 24) isn't replaced by the Y reference.

Initially (see top row 30), both the current entry (CE) (column 24) and the previous miss entry (PME) (column 25) have invalid entries. Memory Reference 1 (row 31, column 21) is for X which misses in both CE and PME. X becomes the valid current entry in both caches (row 32, columns 22 and 24). The invention does a state transition from A to B from Outcome 1. Memory Reference 2 is for Y (row 33, column 21) which also misses in both implementations. Y becomes the valid entry in the conventional case (column 22). X remains the valid entry in the alternative cache (row 34, column 24) which transitions from state B to D due to outcome 1. The Tag of Y is stored in the previous miss entry field (row 34, column 25). Memory Reference 3 is for X (column 21) which is a miss in the conventional case (column 23) and a hit in the alternative case (column 28). X becomes the valid entry in the conventional case (column 22) and remains the valid entry in the alternative case (column 24) which transitions from State D to C due to the Current Entry hit. Memory Reference 4 is for Y which misses in both cases (column 23 and 28). Y becomes the valid entry in the conventional case (column 22) and becomes the previous miss entry in the alternative case (column 25) which transitions from state C to D due to outcome 1. Memory References 5 and 7 match Memory Reference 3 with the same results and transitions. Memory References 6 and 8 match Memory Reference 4 also with the same results and transitions. Steady state occurs at Memory Reference 3 which means the last 6 main memory references are representative of the results of this memory reference pattern. For the conventional implementation, all references miss the cache (column 23). For the alternative implementation, only half miss the cache (column 28). The highlighted cells emphasize the instances in which the alternative direct-mapped cache turns a miss (in a conventional direct-mapped cache) into a hit.

Example 2

FIG. 6 is a table 40 illustrating a sequence of events responsive to a second sequence of memory references using a conventional direct-mapped cache directory and an alternative direct-mapped cache directory according to embodiments of the present invention. The table 40 is structured the same as the table 20, except that the pattern of memory references (column 21) has been changed to XXXXYXXXXY. According, the references to column and row numbers provided in reference to FIG. 6 have been omitted.

As with FIG. 5, two lines of memory (line X and line Y) map to the same cache directory entry, but with line X being referenced more frequently than line Y in the following pattern: XXXXYXXXXY . . . (i.e., a repeating pattern of four references to line X followed by one reference to line Y). As shown in FIG. 6, for the conventional direct-mapped cache, each of the X references that follow an X reference are cache hits. This occurs 3 times in each XXXXY reference pattern for a hit rate of 60% (i.e., 3 hits out of 5 references). With the alternative direct-mapped cache and method of the present invention, the Y reference again does not replace the X once it is in the cache, since there are never two Ys in a row. This produces 4 cache hits out of the 5 references in the pattern for a hit rate of 80% (i.e., 4 hits out of 5 references).

This example starts out the same as the previous example for Memory Reference 1. Memory Reference 2 is also for X which is a cache hit for both conventional and alternative caches. There is no change to the conventional case, while the alternative case transitions from state B to C through Outcome 2. Memory Reference 3 is again for X which is a cache hit for both caches. This time there is no change to either cache. Memory Reference 4 repeats this. Memory Reference 5 is for Y which is a cache miss in both caches. Y becomes the valid cache entry in the conventional case. Y becomes the previous miss entry in the alternative cache with X remaining the valid current entry. A transition from state C to D occurs due to Outcome 1. Memory Reference 6 is for X which is a cache miss in the conventional case and a cache hit in the alternative case. The conventional implementation makes X the valid entry. The alternative implementation transitions from state D to C due to Outcome 2. Memory References 7, 8, and 9 have the same results and transitions as Memory References 3 and 4. Memory Reference 10 has the same results and transitions as Memory Reference 5. Memory References 6 to 10 are representative of this example's reference pattern in steady state. In these 5 memory references, the conventional implementation produces 3 cache hits while the alternative implementation produces 4 cache hits.

Example 3

FIGS. 7A and 7B provide a table 50 illustrating a sequence of events responsive to a third sequence of memory references using a conventional direct-mapped cache directory and an alternative direct-mapped cache directory according to embodiments of the present invention. Again, the table 50 is structured the same as the tables 20 and 40, except that the pattern of memory references (column 21) has been changed to XYXYXYXXXXYYY. According, references to column and row numbers have been omitted.

The example memory reference pattern in table 50 is more complex and includes an XYXYXY segment (see memory references 13-18 at steady state) that results in a higher hit rate for the alternative direct-mapped cache, and an XXXYYY segment (see memory references 19-24 at steady state) that results in a higher hit rate for the conventional direct-mapped cache. As a result, the steady state cache hit rate for the alternative direct-mapped cache is 41.7% and the steady state cache hit rate for the conventional direct-mapped cache is 33.3%. As can be seen, alternative direct-mapped cache provides greater benefits where the memory references change back and forth frequently (FIG. 5) than where the memory references include strings of consecutive, identical memory references (FIGS. 6 and 7A-7B).

Figure 8A:
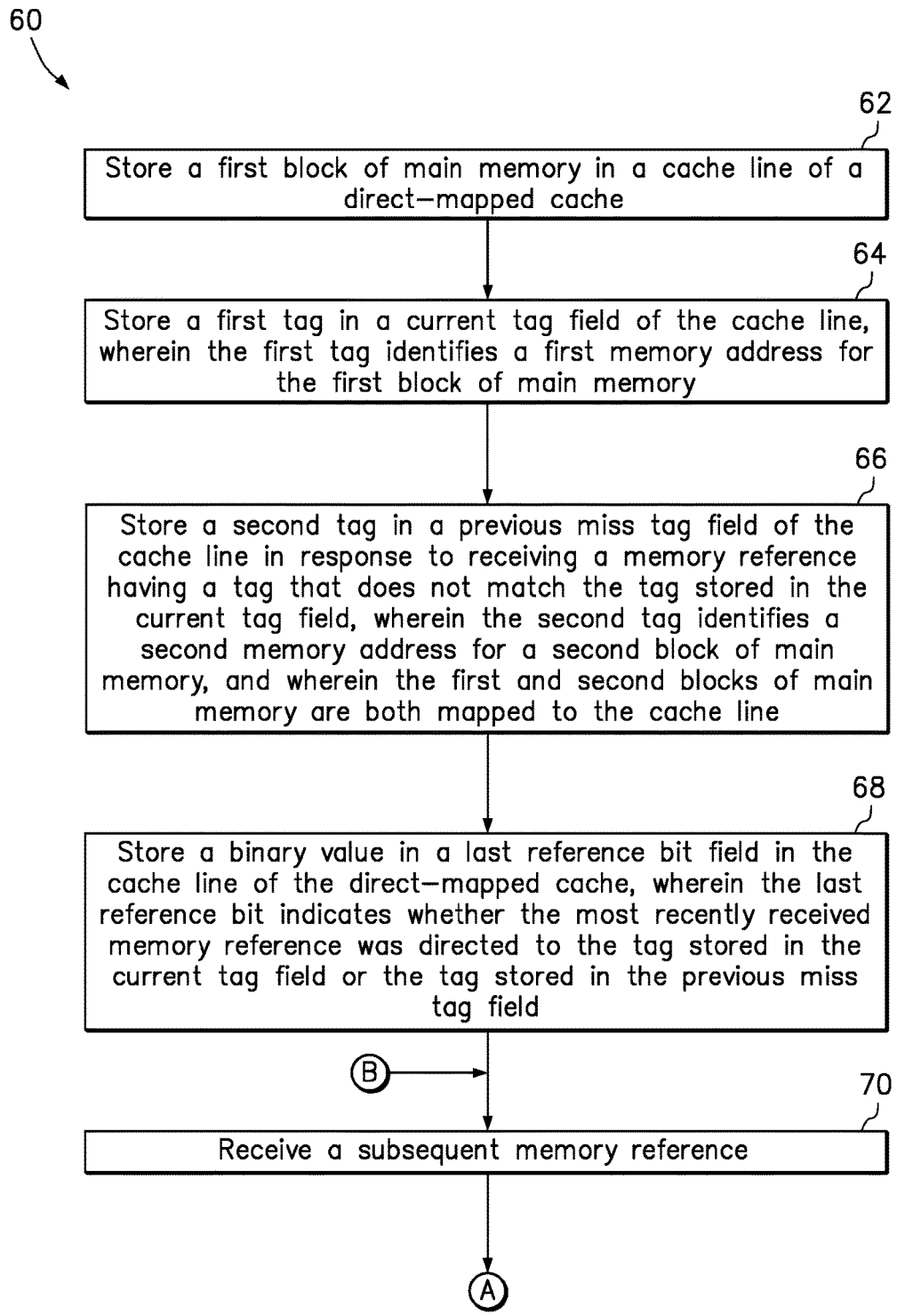
FIGS. 8A and 8B provide a flowchart of a method according to an embodiment of the present invention.
Figure 8B:
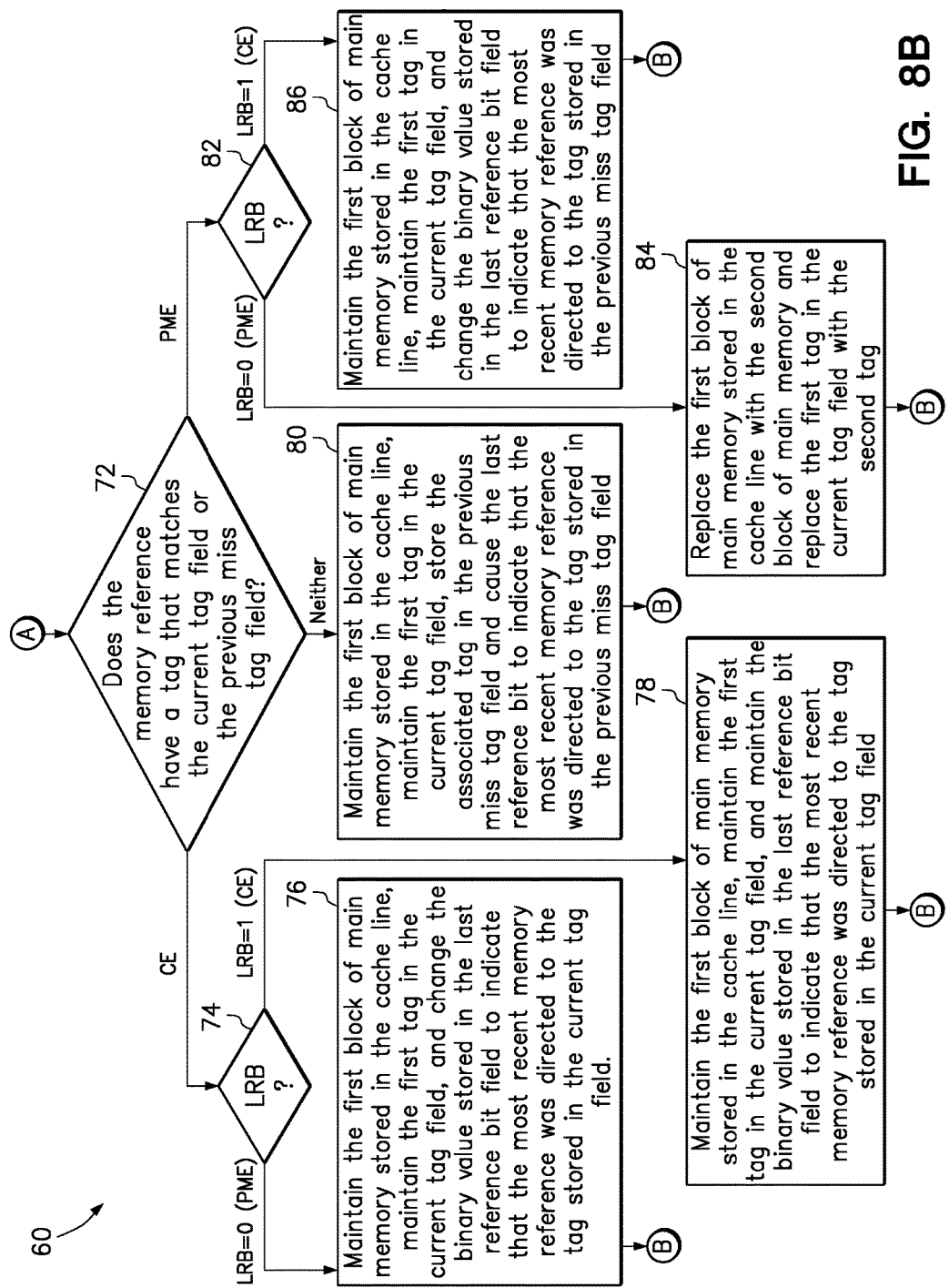

FIGS. 8A and 8B provide a flowchart of a method 60 according to an embodiment of the present invention. As shown in step 62 of FIG. 8A, the method stores a first block of main memory in a cache line of a direct-mapped cache. In step 64, the method stores a first tag in a current tag field of the cache line, wherein the first tag identifies a first memory address for the first block of main memory. In step 66, the method stores a second tag in a previous miss tag field of the cache line in response to receiving a memory reference having a tag that does not match the tag stored in the current tag field, wherein the second tag identifies a second memory address for a second block of main memory, and wherein the first and second blocks of main memory are both mapped to the cache line. Then, in step 68, the method stores a binary value in a last reference bit field in the cache line of the direct-mapped cache, wherein the last reference bit indicates whether the most recently received memory reference was directed to the tag stored in the current tag field or the tag stored in the previous miss tag field. Accordingly, the method populates an alternative direct-mapped cache including certain fields of the alternative direct-mapped cache 10 of FIG. 3.

In step 70, a subsequent memory reference is received. Then, as shown in FIG. 8B, step 72 determines whether the memory reference has a tag that matches the current tag field or the previous miss tag field. The branches of possible situations will be discussed from left to right in FIG. 8B. If step 72 finds that the memory reference tag matches the CE tag and step 74 determines that the last referenced bit refers to the PME, then step 76 maintains the first block of main memory stored in the cache line, maintains the first tag in the current tag field, and changes the binary value stored in the last reference bit field to indicate that the most recent memory reference was directed to the tag stored in the current tag field. If step 72 finds that the memory reference tag matches the CE tag and step 74 determines that the last referenced bit refers to the CE, then step 78 maintains the first block of main memory stored in the cache line, maintains the first tag in the current tag field, and maintains the binary value stored in the last reference bit field to indicate that the most recent memory reference was directed to the tag stored in the current tag field. If step 72 finds that the memory reference tag does not match either the CE tag or the PME tag, then step 80 maintains the first block of main memory stored in the cache line, maintains the first tag in the current tag field, stores the associated tag in the previous miss tag field and causes the last reference bit to indicate that the most recent memory reference was directed to the tag stored in the previous miss tag field. If step 72 finds that the memory reference tag matches the PME tag and step 82 determines that the last referenced bit refers to the PME, then step 84 replaces the first block of main memory stored in the cache line with the second block of main memory and replaces the first tag in the current tag field with the second tag. If step 72 finds that the memory reference tag matches the PME tag and step 82 determines that the last referenced bit refers to the CE, then step 86 maintains the first block of main memory stored in the cache line, maintains the first tag in the current tag field, and changes the binary value stored in the last reference bit field to indicate that the most recent memory reference was directed to the tag stored in the previous miss tag field. An alternative method is to not check for a Previous Miss Entry hit unless the last reference bit refers to the PME. This saves a directory lookup and comparison. The result in all cases is the same whether or not the memory reference matches the previous miss entry. The method may further include read and write operations to the cache line and/or main memory consistent with known cache management techniques, and the method may return to step 70 to handle additional subsequent memory references. The results of the method 60 are those exhibited in Examples 1-3 of FIGS. 5-7B.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    storing a first block of main memory in a cache line of a direct-mapped cache;
    storing a first tag in a current tag field of the cache line, wherein the first tag identifies a first memory address for the first block of main memory, and
    storing a second tag in a previous miss tag field of the cache line in response to receiving a memory reference having a tag that does not match the tag stored in the current tag field, wherein the second tag identifies a second memory address for a second block of main memory, and wherein the first and second blocks of main memory are both mapped to the cache line.

2. The method of claim 1, wherein the first block of main memory is stored in the cache line in response to receiving a memory reference to the first block while the cache line does not have a block stored in the cache line, and wherein the first tag is stored in the current tag field of the cache line in response to storing the first block of main memory in the cache line.

3. The method of claim 1, further comprising:
    storing a first binary value in a last reference bit field in the cache line of the direct-mapped cache, wherein the first binary value indicates that the most recently received memory reference was directed to the tag stored in the current tag field.

4. The method of claim 1, further comprising:
    storing a binary value in a last reference bit field in the cache line of the direct-mapped cache, wherein the last reference bit indicates whether the most recently received memory reference was directed to the tag stored in the current tag field or the tag stored in the previous miss tag field.

5. The method of claim 4, further comprising:
    in response to subsequently receiving a memory reference having a tag that matches the tag stored in the previous miss tag field and the binary value stored in the last reference bit field indicating that the most recent memory reference was directed to the tag stored in the previous miss tag field, replacing the first block of main memory stored in the cache line with the second block of main memory and replacing the first tag in the current tag field with the second tag.

6. The method of claim 5, further comprising:
    writing the first block back to main memory prior to replacing the first block of main memory with the second block of main memory in response to the first block having been modified since the first block was written back to main memory.

7. The method of claim 4, further comprising:
    in response to subsequently receiving a memory reference having a tag that matches the tag stored in the current tag field and the binary value stored in the last reference bit field indicating that the most recent memory reference was directed to the tag stored in the previous miss tag field, maintaining the first block of main memory stored in the cache line, maintaining the first tag in the current tag field, and changing the binary value stored in the last reference bit field to indicate that the most recent memory reference was directed to the tag stored in the current tag field.

8. The method of claim 4, further comprising:
    in response to subsequently receiving a memory reference having a tag that matches the tag stored in the previous miss tag field and the binary value stored in the last reference bit field indicating that the most recent memory reference was directed to the tag stored in the current tag field, maintaining the first block of main memory stored in the cache line, maintaining the first tag in the current tag field, and changing the binary value stored in the last reference bit field to indicate that the most recent memory reference was directed to the tag stored in the previous miss tag field.

9. The method of claim 4, further comprising:
    in response to subsequently receiving a memory reference having a tag that matches the tag stored in the current tag field and the binary value stored in the last reference bit field indicating that the most recent memory reference was directed to the tag stored in the current tag field, maintaining the first block of main memory stored in the cache line, maintaining the first tag in the current tag field, and maintaining the binary value stored in the last reference bit field to indicate that the most recent memory reference was directed to the tag stored in the current tag field.

10. The method of claim 4, further comprising:
    in response to subsequently receiving a memory reference having an associated tag that does not match the tag stored in the previous miss tag field and does not match the tag stored in the current tag field, maintaining the first block of main memory stored in the cache line, maintaining the first tag in the current tag field, storing the associated tag in the previous miss tag field and causing the last reference bit to indicate that the most recent memory reference was directed to the tag stored in the previous miss tag field.

11. The method of claim 1, wherein each cache line of the direct-mapped cache further includes a multiple reference bit indicating whether the current memory address has been referenced more than once.

12. The method of claim 1, wherein each tag is a first portion of a main memory address that is mapped to the cache line, and wherein each memory address includes an index portion that identifies the cache line being addressed.

13. The method of claim 1, further comprising:
    performing a read operation on the block stored in the cache line in response to receiving a read instruction with a memory reference having a tag that matches the tag stored in the current tag field; and performing a write operation on the block stored in the cache line in response to receiving a write instruction with a memory reference having a tag that matches the tag stored in the current tag field.

14. A computer program product for implementing a cache replacement policy, the computer program product comprising a non-transitory computer readable storage medium having program instructions embodied therewith, the program instructions executable by a processor to cause the processor to:
   store a first block of main memory in a cache line of a direct-mapped cache;
   store a first tag in a current tag field of the cache line, wherein the first tag identifies a first memory address for the first block of main memory, and
   store a second tag in a previous miss tag field of the cache line in response to receiving a memory reference having a tag that does not match the tag stored in the current tag field, wherein the second tag identifies a second memory address for a second block of main memory, and wherein the first and second blocks of main memory are both mapped to the cache line.

15. The computer program product of claim 14, wherein the program instructions are further executable by the processor to cause the processor to:
   store a binary value in a last reference bit field in the cache line of the direct-mapped cache, wherein the last reference bit indicates whether the most recently received memory reference was directed to the tag stored in the current tag field or the tag stored in the previous miss tag field.

16. The computer program product of claim 15, wherein the program instructions are further executable by the processor to cause the processor to:
   in response to subsequently receiving a memory reference having a tag that matches the tag stored in the previous miss tag field and the binary value stored in the last reference bit field indicating that the most recent memory reference was directed to the tag stored in the previous miss tag field, replace the first block of main memory stored in the cache line with the second block of main memory and replace the first tag in the current tag field with the second tag.

17. The computer program product of claim 15, wherein the program instructions are further executable by the processor to cause the processor to:
   in response to subsequently receiving a memory reference having a tag that matches the tag stored in the current tag field and the binary value stored in the last reference bit field indicating that the most recent memory reference was directed to the tag stored in the previous miss tag field, maintain the first block of main memory stored in the cache line, maintain the first tag in the current tag field, and change the binary value stored in the last reference bit field to indicate that the most recent memory reference was directed to the tag stored in the current tag field.

18. The computer program product of claim 15, wherein the program instructions are further executable by the processor to cause the processor to:
   in response to subsequently receiving a memory reference having a tag that matches the tag stored in the previous miss tag field and the binary value stored in the last reference bit field indicating that the most recent memory reference was directed to the tag stored in the current tag field, maintain the first block of main memory stored in the cache line, maintain the first tag in the current tag field, and change the binary value stored in the last reference bit field to indicate that the most recent memory reference was directed to the tag stored in the previous miss tag field.

19. The computer program product of claim 15, wherein the program instructions are further executable by the processor to cause the processor to:
   in response to subsequently receiving a memory reference having a tag that matches the tag stored in the current tag field and the binary value stored in the last reference bit field indicating that the most recent memory reference was directed to the tag stored in the current tag field, maintain the first block of main memory stored in the cache line, maintain the first tag in the current tag field, and maintain the binary value stored in the last reference bit field to indicate that the most recent memory reference was directed to the tag stored in the current tag field.

20. The computer program product of claim 15, wherein the program instructions are further executable by the processor to cause the processor to:
   in response to subsequently receiving a memory reference having an associated tag that does not match the tag stored in the previous miss tag field and does not match the tag stored in the current tag field, maintain the first block of main memory stored in the cache line, maintain the first tag in the current tag field, store the associated tag in the previous miss tag field and cause the last reference bit to indicate that the most recent memory reference was directed to the tag stored in the previous miss tag field.

* * * * *